United States Patent Office 3,277,216
Patented Oct. 4, 1966

---

3,277,216
THIOL- OR THIONOTHIOLPHOSPHORIC (-PHOSPHONIC, -PHOSPHINIC) ACID ESTERS
Gerhard Schrader, Wuppertal-Cronenberg, Germany, assignor to Farbenfabriken Bayer Aktiengesellschaft, Leverkusen, Germany, a German corporation
No Drawing. Filed May 26, 1964, Ser. No. 370,340
Claims priority, application Germany, May 28, 1963, F 39,856
11 Claims. (Cl. 260—948)

The present invention relates to and has as its object novel and useful, pesticidally, especially insecticidally and acaricidally active phosphorus-containing compounds.

This invention is concerned with thiol- or thionothiolphosphoric (-phosphonic, -phosphinic) acid esters of the formula

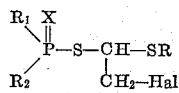

as well as a process for the production thereof. In the above formula R means a lower alkyl radical with at least two carbon atoms or an aryl, preferably phenyl, radical, which may be substituted by halogen and/or lower alkyl, $R_1$ and $R_2$ stand for lower alkyl, alkoxy or aryl, preferably phenyl radicals, X represents an oxygen or sulphur atom and Hal a halogen atom.

Compounds of the constitution as indicated above have so far not been described in the literature.

In accordance with the present invention it has now been found that thiol- or thionothiol-phosphoric (-phosphonic, -phosphinic) acid esters of the above-mentioned structure can be obtained by a technically simple reaction, if 2-haloethyl-thio-alkyl or -aryl ethers of the general formula $$\text{Hal—CH}_2\text{—CH}_2\text{—S—R}$$

are treated with halogenating agents, preferably sulfuryl chloride or elementary chlorine, and the α,β-dihaloethyl-thio-alkyl-or-aryl ethers of the formula

formed as intermediate products are subsequently reacted with thiol- or thionothiol-phosphoric (-phosphonic, -phosphinic) acid salts of the general formula:

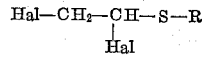

In the above formulae the symbols R, $R_1$, $R_2$, and X have the same meaning as indicated above, while Me stands for a monovalent metal equivalent, preferably an alkali metal atom or the ammonium group.

The course of the inventive process may be illustrated by the following reaction scheme:

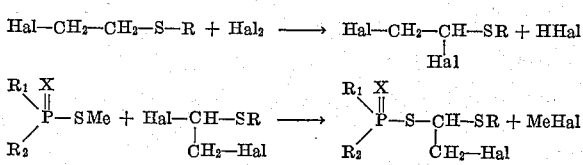

The first step of the reaction according to the invention, i.e. the α-halogenation of the 2-haloethyl-thio-alkyl or -aryl ethers is preferably carried out at low temperatures (—10 to +10° C.), since the reaction proceeds already in the cold with sufficient speed and satisfactory yields.

Surprisingly, only the halogen atom in α-position of the α,β-dihaloethyl-thio-alkyl or -aryl ethers reacts with the above mentioned thiol- or thionothiol-phosphoric (-phosphonic, -phosphinic) acid salts, even at room temperature or slightly elevated temperatures and compounds of the above-mentioned constitution are obtained.

It is thereby unnecessary to isolate the intermediate products formed in the first reaction step; they may be reacted according to the present invention, directly after their formation and in the same solution according to the above equation.

The inventive process is preferably carried out in the presence of inert organic solvents. For the halogenation reaction, chlorinated hydrocarbons, for example methylene chloride, chloroform or carbon tetrachloride have proved especially useful, while the subsequent reaction with the salts of the corresponding thiol- or thionothiol-phosphoric (-phosphonic, -phosphinic) acids proceeds especially smoothly and with very good yields in polar solvents such as lower aliphatic ketones or nitriles for example acetone, methyl ethyl ketone, methyl isopropyl ketone and methyl isobutyl ketone as well as aceto-nitrile or propionitrile.

The thiol- or thionothiol-phosphoric (-phosphonic, -phosphinic) acid esters which can be prepared according to the invention are usually obtained in the form of colourless to slightly coloured oils, which may mostly be distilled under strongly reduced pressure.

Tht inventive products possess excellent pesticidal, especially insecticidal and acaricidal properties; they are therefore employed as agents for plant protection or pest control.

The new compounds of the present invention very effectively kill insects like aphids, bugs, spider mites, caterpillars, beetles, cockroaches, flies, termites, ticks, mosquitoes. They distinguish themselves especially by a good contact-insecticidal activity and mostly also by a strong systemic and good ovicidal action. At the same time they have an activity on eating insects such as caterpillars. Most surprisingly they are of remarkably low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae (I)

(II)

(III)

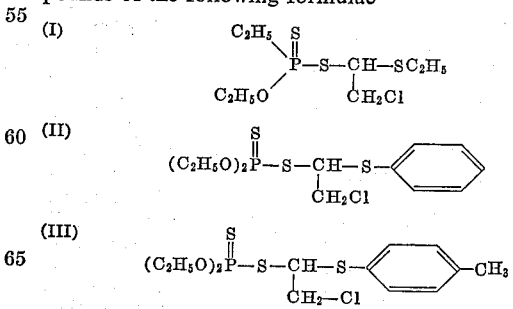

have been tested against spider mites, caterpillars (compound I) and mosquito larvae (compound III). Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at least with water to the desired concentration indicated in the following paragraphs.

The tests have been carried out as follows:

(a) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| (I) | 0.001 | 100 |
| (II) | 0.01 | 100 |
| (III) | 0.1 | 100 |

(b) Against caterpillars of the type diamond black moth (*Plutella maculipennis*): White cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate (in percent) |
|---|---|---|
| (I) | 0.01 | 100 |

(c) Against mosquito larvae of the type *Aedes aegypti*: About 8–12 mosquitoes are placed under covered Petri dishes in which drip wet filter papers have been placed which have been sprayed with an insecticidal solution prepared as indicated above and in a concentration as shown below. The living status has been determined after 24 hours. The following results have been obtained:

| Compound | Aqueous concentration (in percent active ingredient/water) | Killing rate (in percent) |
|---|---|---|
| (III) | 0.0001 | 80 |

The following examples are given for the purpose of illustrating the invention as claimed:

*Example 1*

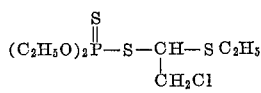

63 g. (0.5 mol) of β-chloroethyl-thioethyl ether are dissolved in 400 cc. of methylene chloride. To this solution are added dropwise, with stirring, 68 g. of sulfuryl chloride and, after termination of the addition, the mixture is stirred for about one hour at the stated temperature. Subsequently the solvent is distilled off under reduced pressure. 112 grams of the potassium salt of O,O-diethyl-thionothiol-phosphoric acid are then dissolved in 300 cc. of acetonitrile and the residue from the distillation is added to this solution at room temperature, while stirring. An exothermic reaction occurs; the temperature of the mixture rises to 50° C. The reaction mixture is stirred at this temperature for another hour and then poured into 400 cc. of ice water. The separated oil is taken up in 400 cc. of benzene, the benzene layer is deacidified with a 3% sodium bicarbonate solution and subsequently dried over sodium sulfate. By subsequent fractional distillation 107 g. (69% of the theoretical yield) of O,O-diethyl-thiononthiol-phosphoric acid -S-(1-ethylmercapto-2-chloro-ethyl) ester of B.P. 104° C. at 0.01 mm. Hg are obtained.

Spider mites are completely destroyed by 0.01% solutions of the compound. The systemic action of 0.1% solutions against aphids amounts to 10%.

By the same method the following compounds can be prepared:

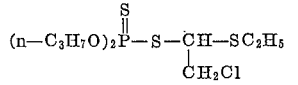

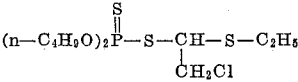

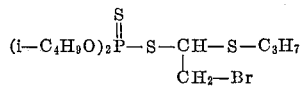

*Example 2*

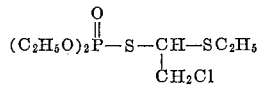

68 g. of sulfuryl chloride are added to a solution of 63 g. (0.5 mol) of β-chloroethyl-thioethyl ether in 400 cc. of methylene chloride at 0° C., with stirring, the mixture is subsequently stirred for one hour at 0° C. and the solvent is then distilled off under reduced pressure. The distillation residue is added dropwise at room temperature, while stirring, to a solution of 95 g. of the ammonium salt of O,O-diethyl-thiol-phosphoric acid in 300 cc. of acetonitrile. An exothermic reaction occurs, the temperature of the mixture rising to 50 to 60° C. The mixture is subsequently heated for another hour at 50° C. and then worked up as described in Example 1. 96 g. (66% of the theoretical yield) of O,O-diethyl-thiol-phosphoric acid-S-(1-ethylmercapto-2-chloroethyl) ester of B.P. 108° C. at 0.01 mm. Hg are obtained.

Spider mites are killed to 95% by 0.01% solutions of the compound. The systemic action of 0.1% solution is 100%.

*Example 3*

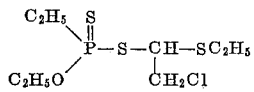

63 g. (0.5 mol) of β-chloroethyl-thioethyl ether are dissolved in 400 cc. of methylene chloride and 68 g. of sulfuryl chloride are added dropwise to this solution at 0° C. One hour after termination of the addition, the solvent is distilled off under reduced pressure and the distillation residue is added dropwise to a solution of 104 g. of the potassium salt of ethyl-O-ethyl-thionothiol-phosphonic acid in 300 cc. of acetonitrile. The reaction mixture is heated for one hour at 40° C. and then worked up as described in Example 1. 86 g. (59% of the theoretical yield) of the ethyl-thionothiol-phosphonic acid-O-ethyl-S-(1-ethylmercapto-2-chloroethyl) ester of B.P. 108° C. at 0.01 mm. Hg are obtained.

Spider mites are completely destroyed by 0.001% solutions of the product, caterpillars by 0.01% solutions.

In the same way there can be produced the following compounds:

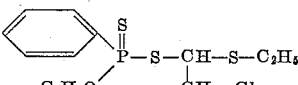

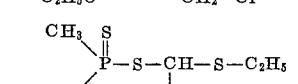

Example 4

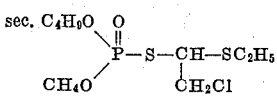

63 g. (0.5 mol) of β-chloroethyl-thioethyl ether are dissolved in 400 cc. of methylene chloride. To this solution 68 g. of sulfuryl chloride are added dropwise at 0° C. and the solvent is distilled off under reduced pressure one hour after the termination of the addition. The distillation residue is added dropwise, with stirring, to a solution of 101 g. of the potassium salt of O-methyl-O-sec. butyl-thiol-phosphoric acid in 300 cc. of acetonitrile. The reaction mixture is subsequently heated for one hour, while stirring, at 30 to 40° C. and then worked up as described in Example 1. The O-methyl-O-sec. butyl-thiol-phosphoric acid-S-(1-ethyl-mercapto-2-chloroethyl) ester is obtained in the form of a water-insoluble oil. The yield amounts to 98 g. (64% of the theoretical).

*Analysis.*—Calculated for a molecular weight of 307: P, 10.1%; S, 20.9%; Cl, 1.6%. Found: P, 10.7%; S, 21.1%; Cl, 11.6%.

Aphids (contact-insecticidal activity) are killed to 100% by 0.1% solutions of the compound. The systematic action of 0.1% solutions amounts to 100%.

In the same manner there can be produced the following compounds:

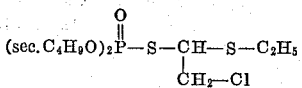

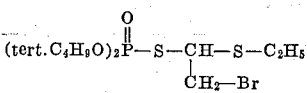

Example 5

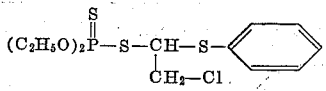

68 g. of sulfuryl chloride are added dropwise to a solution of 87 g. (0.5 mol) of β-chloroethyl-thiophenyl ether in 400 cc. of methylene chloride and the solvent is evaporated under reduced pressure one hour after the termination of the addition. The distillation residue is added dropwise, with stirring, to a solution of 112 g. of the potassium salt of O,O-diethyl-thionothiol-phosphoric acid in 300 cc. of acetonitrile, the mixture is subsequently heated for one hour at 50–60° C. and then worked up as described in Example 1. The O,O-diethyl-thionothiol-phosphoric acid-S-(1-phenyl-mercapto-2-chloroethyl) ester is obtained in the form of a water-insoluble oil. The yield amounts to 135 g. (76% of the theoretical).

*Analysis.*—Calculated for a molecular weight of 357: P, 8.7%; Cl, 10.0%; S, 26.9%. Found: P, 8.5%; Cl, 10.8%; S, 26.3%.

Spider mites are completely destroyed by 0.001% solutions of the compound. By the same method there can be prepared the following compounds:

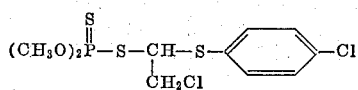

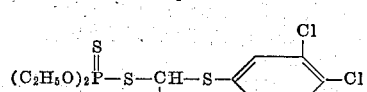

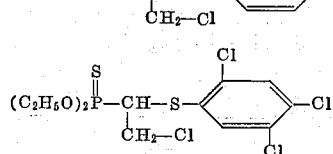

Example 6

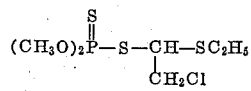

63 g. (0.5 mol) of β-chloroethyl-thioethyl ether are dissolved in 400 cc. of methylene chloride and to this solution 68 g. of sulfuryl chloride are added, at 0° C., with stirring. One hour after termination of the addition the solvent is distilled off under reduced pressure. The distillation residue is added, while stirring, to a solution of 88 g. of the ammonium salt of O,O-dimethyl-thionothiol-phosphoric acid in 300 cc. of acetonitrile, the mixture is then heated to 50 to 60° C. and is subsequently worked up as described in Example 1. 98 g. (70% of the theoretical yield) of O,O-dimethyl-thionothiol-phosphoric acid-S-(1-ethylmercapto-2-chloroethyl) ester are obtained in the form of a water-insoluble oil.

*Analysis.*—Calculated for a molecular weight of 281: P, 11.1%; Cl, 12.6%; S, 34.2%. Found: P, 11.5%; Cl, 12.5%; S, 34.2%.

Spider mites are completely destroyed by 0.01% solutions of the product. The systemic action of 0.1% solutions against aphids amounts to 100%.

Example 7

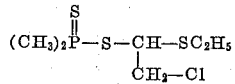

63 g. (0.5 mol) of β-chloroethyl-thioethyl ether are dissolved in 400 cc. of methylene chloride. To this solution 68 g. of sulfuryl chloride are added dropwise at 0° C., with stirring, the mixture is then stirred for a further 30 minutes and the solvent is evaporated under reduced pressure. The residue is added at 20 to 30° C. while stirring, to 82 g. of the potassium salt of dimethyl-thionothiol-phosphinic acid, dissolved in 300 cc. of acetonitrile. The reaction mixture is subsequently stirred for another hour and then worked up as described in Example 1. 100 g. (80% of the theoretical yield) of the dimethyl-thionothiol-phosphinic acid-S-(1-ethylmercapto - 2-chloroethyl) ester are obtained in form of a water-insoluble, pale yellow oil.

*Analysis.*—Calculated for a molecular weight of 249: S, 38.6%; Cl, 14.3%; P, 12.5%. Found: S, 39.0%; Cl, 13.7%; P, 12.9%.

Mosquito larvae are killed to 100% by 0.001% solutions of the compound and spider mites by 0.1% solutions.

By the same methods there can be prepared the following compounds:

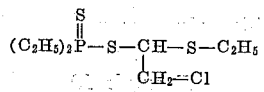

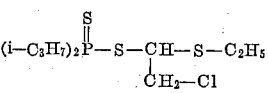

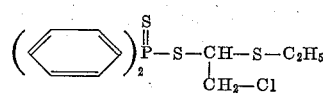

Example 8

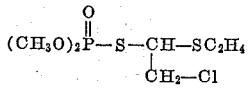

63 g. (0.5 mol) of β-chloroethyl-thioethyl ether are dissolved in 400 cc. of methylene chloride, 68 g. of sulfuryl chloride are added dropwise to this solution at 0° C. with stirring, the mixture is then further stirred for 30 minutes and the solvent is then evaporated under reduced pressure. The residue is added dropwise at 30 to 40° C. while still stirring, to a solution of 85 g. of the ammonium salt of O,O-dimethyl-thiol-phosphoric acid in 300 cc. of acetonitrile. The reaction mixture is subsequently stirred for another hour and then worked up as described in Example 1. 98 g. (74% of the theoretical yield) of O,O-dimethyl-thiol-phosphoric acid-S-(1-ethylmercapto-2-chloroethyl)ester are obtained as a pale yellow water-insoluble oil.

*Analysis.*—Calculated for a molecular weight of 265: P, 11.7%; Cl, 13.4%; S, 24.2%. Found: P, 11.8%; Cl, 14.0%; S, 24.0%.

Grain weevils are completely killed by 0.1% solutions of the compound.

Example 9

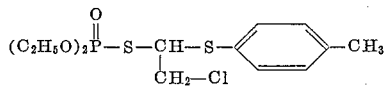

To a solution of 94 g. (0.5 mol) of β-chloroethyl-(4-methylphenyl)-thioether (B.P. 108° C. at 0.2 mm. Hg, M.P. 20° C.) in 400 cc. of methylene chloride 68 g. of sulfuryl chloride are added dropwise at 0° C., with stirring, the reaction mixture is then further stirred for 30 minutes and the solvent is then evaporated under reduced pressure. The residue is added dropwise with further stirring at 20 to 30° C. to a solution of 94 g. of the ammonium salt of O,O-diethyl-thiol-phosphoric acid in 300 cc. of acetonitrile. The mixture is subsequently heated at 60° C. for one hour and it is then worked up as described in Example 1. The O,O-diethyl-thiol-phosphoric acid-S-[1-(4'-methyl-phenyl)-mercapto-2-chloroethyl]ester is obtained in the form of a yellow water-insoluble oil. The yield amounts to 134 g. (76% of the theoretical).

*Analysis.*—Calculated for a molecular weight of 355: S, 18.0%; P, 8.7%; Cl, 10.0%. Found: S, 18.2%; P, 9.2%; Cl, 10.2%.

Spider mites are completely destroyed by 0.1% solutions of the product.

In the same manner there can be obtained the following compounds:

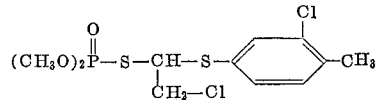

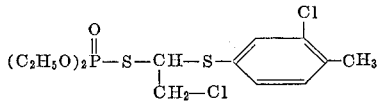

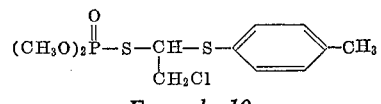

Example 10

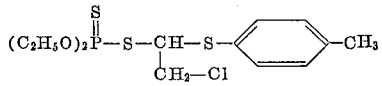

94 g. (0.5 mol) of β-chloroethyl-(4-methylphenyl)-thioether are dissolved in 400 cc. of methylene chloride and to this solution 68 g. of sulfuryl chloride are added at 0° C. with stirring. The mixture is subsequently stirred for 30 minutes, the solvent is evaporated under reduced pressure and the residue is added dropwise with further stirring to a solution of 112 g. of the potassium salt of O,O-diethyl-thionothiol-phosphoric acid in 300 cc. of acetonitrile. Finally the reaction mixture is heated at 60° C. for one hour and then worked up as in Example 1. 142 g. of the O,O-diethyl-thionothiol-phosphoric acid-S-[1-(4''-methylphenyl-)-mercapto-2-chloroethyl]-ester are obtained in form of a yellow water-insoluble oil.

*Analysis.*—Calculated for a molecular weight of 371: S, 26.6%; P, 8.4%; Cl, 9.5%. Found: S, 25.9%; P, 8.7%; Cl, 9.4%.

Spider mites are completely destroyed by 0.1% solutions of the compound and mosquito larvae are killed to 80% even by 0.001% solutions.

Example 11

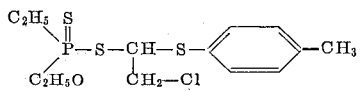

To a solution of 94 g. (0.5 mol) of β-chloroethyl-(4-methylphenyl)-thioether in 400 cc. of acetonitrile 68 g. of sulfuryl chloride are added at 0° C. The mixture is subsequently stirred for 30 minutes, then the solvent is evaporated under reduced pressure and the residue is added dropwise with further stirring to a solution of 104 g. of the potassium salt of ethyl-O-ethyl-thionothiol-phosphonic acid in 300 cc. of acetonitrile. The reaction mixture is then heated at 60° C. for one hour and finally worked up as described in Example 1. 141 g. (79% of the theoretical yield) of ethyl-thionothiol-phosphonic acid-O-ethyl-S-[1-(4'-methylphenyl) - mercapto-2-chloroethyl] ester are obtained as a colourless water-insoluble oil.

*Analysis.*—Calculated for a molecular weight of 355: S, 26.9%; Cl, 10.0%; P, 8.8%. Found: S, 25.9%; Cl, 11.0%; P, 8.8%.

Spider mites are killed to 60% by 0.01% solutions of the ester and mosquito larvae are destroyed to 50% even by 0.00001% solutions. By the same methods there can be prepared the following compounds:

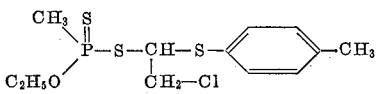

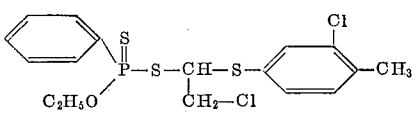

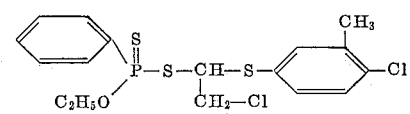

Example 12

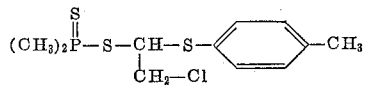

94 g. (0.5 mol) of β-chloroethyl-(4-methylphenyl)-thio-ether are dissolved in 400 cc. of acetonitrile and to this solution 68 g. of sulfuryl chloride are added at 0° C. with stirring. Thirty minutes after termination of the addition, the solvent is evaporated under reduced pressure. The residue is added dropwise at 20 to 30° C. to a solution of 82 g. of the potassium salt of dimethyl-thionothiolphosphinic acid in 300 cc. of acetonitrile, the reaction mixture is subsequently heated at 60° C. for one hour and then worked up as described in Example 1. 135 g. (88% of the theoretical yield) of the dimethyl-thionothiol phosphinic acid -S-[1-4'-methylphenyl-)mercapto-2-chloroethyl-]ester are obtained in the form of a water-insoluble colourless oil.

*Analysis.*—Calculated for a molecular weight of 311: S, 30.8%; Cl, 11.4%; P, 9.9%. Found: S, 29.0%; Cl, 12.0%; P, 9.1%.

Spider mites are completely destroyed by 0.1% solutions of the ester. In the same manner there can be produced the following compounds:

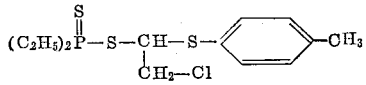

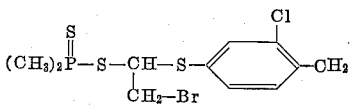

I claim:
1. A compound of the formula

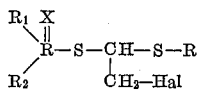

in which
R stands for a member selected from the group consisting of lower alkyl having 2–4 carbon atoms, phenyl, halogen-substituted phenyl, lower alkyl-substituted phenyl, halogen- and lower alkyl-substituted phenyl, lower alkyl in each case having up to 4 carbon atoms and in which
$R_1$ and $R_2$ stand for members selected from the group consisting of lower alkyl having up to 4 carbon atoms, lower alkoxy having up to 4 carbon atoms and phenyl and in which
X stands for a member selected from the group consisting of oxygen and sulfur and
Hal stands for a member selected from the group consisting of chlorine and bromine.

2. A compound of the formula

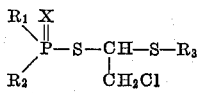

in which
$R_1$ and $R_2$ stand for members selected from the group consisting of lower alkyl having up to 4 carbon atoms, lower alkoxy having up to 4 carbon atoms and phenyl and in which
$R_3$ stands for a member selected from the group consisting of lower alkyl having 2–4 carbon atoms, phenyl and tolyl and in which
X stands for a member selected from the group consisting of oxygen and sulfur.

3. A compound of the formula

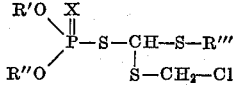

in which
R' and R'' stand for lower alkyl having up to 4 carbon atoms and
R''' stands for a member selected from the group consisting of ethyl, phenyl and p-tolyl and in which
X stands for a member selected from the group consisting of oxygen and sulfur.

4. A compound of the formula

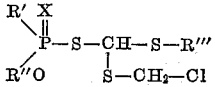

in which
R' and R'' stand for lower alkyl having up to 4 carbon atoms and
R''' stands for a member selected from the group consisting of ethyl, phenyl and p-tolyl and in which
X stands for a member selected from the group consisting of oxygen and sulfur.

5. A compound of the formula

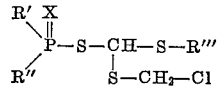

in which
R' and R'' stand for lower alkyl having up to 4 carbon atoms and
R''' stands for a member selected from the group consisting of ethyl, phenyl and p-tolyl and in which
X stands for a member selected from the group consisting of oxygen and sulfur.

6. The compound of the formula

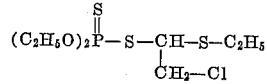

7. The compound of the formula

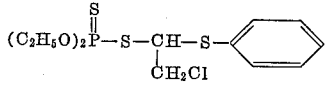

8. The compound of the formula

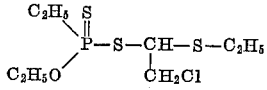

9. The compound of the formula

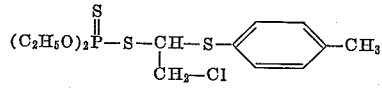

10. The compound of the formula

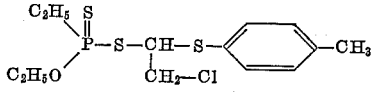

11. The compound of the formula

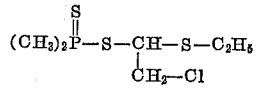

References Cited by the Examiner
UNITED STATES PATENTS

| | | | |
|---|---|---|---|
| 2,968,591 | 1/1961 | Tracy | 167—22 |
| 3,017,422 | 1/1962 | Thompson | 260—461 |
| 3,079,417 | 2/1963 | Farrar | 260—461 |
| 3,080,274 | 3/1963 | Legator et al. | 167—22 |

CHARLES B. PARKER, *Primary Examiner.*

JOSEPH P. BRUST, *Examiner.*

RICHARD L. RAYMOND, *Assistant Examiner.*

UNITED STATES PATENT OFFICE
CERTIFICATE OF CORRECTION

Patent No. 3,277,216                           October 4, 1966

Gerhard Schrader

It is hereby certified that error appears in the above numbered patent requiring correction and that the said Letters Patent should read as corrected below.

Column 5, line 5, the left-hand portion of the formula reading $CH_4O$             read             $CH_3O$ column 6, line 66, the upper right-hand portion of the formula reading $SC_2H_4$             read             $SC_2H_5$ column 9, line 4, the right-hand portion of the formula reading $CH_2$             read             $CH_3$ column 9, lines 47 and 59, and column 10, line 11, the right-hand side portion of the formulas, each occurrence, reading $$\begin{array}{c} -S-CH-S \\ | \\ S-CH_2-Cl \end{array} \quad \text{read} \quad \begin{array}{c} -S-CH-S \\ | \\ CH_2-Cl \end{array}$$

Signed and sealed this 5th day of September 1967.

(SEAL)
Attest:

ERNEST W. SWIDER                          EDWARD J. BRENNER
Attesting Officer                          Commissioner of Patents